(12) United States Patent
Cao et al.

(10) Patent No.: US 11,365,133 B1
(45) Date of Patent: Jun. 21, 2022

(54) VACUUM FREEZING NUCLEATED LIQUID WATER FOR PURIFYING BRACKISH WATER

(71) Applicant: ADVANCED COOLING TECHNOLOGIES, INC., Lancaster, PA (US)

(72) Inventors: Fangyu Cao, Alexandria, VA (US); Jianjian Wang, Lancaster, PA (US); Howard Pearlman, Haddon Township, NJ (US)

(73) Assignee: ADVANCED COOLING TECHNOLOGIES, INC., Lancaster, PA (US)

( * ) Notice: Subject to any disclaimer, the term of this patent is extended or adjusted under 35 U.S.C. 154(b) by 389 days.

(21) Appl. No.: 16/400,522

(22) Filed: May 1, 2019

Related U.S. Application Data

(60) Provisional application No. 62/669,754, filed on May 10, 2018.

(51) Int. Cl.
  *C02F 1/22* (2006.01)
  *C02F 1/26* (2006.01)
  *C02F 103/08* (2006.01)

(52) U.S. Cl.
  CPC .............. *C02F 1/22* (2013.01); *C02F 1/265* (2013.01); *C02F 2103/08* (2013.01)

(58) Field of Classification Search
  CPC ........ C02F 1/22; C02F 1/265; C02F 2103/08; B01D 2311/04; B01D 21/01; Y02A 20/132; Y02A 20/124; Y10S 203/18
  See application file for complete search history.

(56) References Cited

U.S. PATENT DOCUMENTS

| | | | | |
|---|---|---|---|---|
| 3,399,538 A | * | 9/1968 | Sliepcevich | C02F 1/22 203/DIG. 17 |
| 3,425,235 A | * | 2/1969 | Cox | C02F 1/22 202/205 |
| 3,501,924 A | * | 3/1970 | Ashley | C02F 1/22 62/542 |
| 3,974,039 A | * | 8/1976 | Frohner | C02F 1/042 159/DIG. 13 |
| 4,406,748 A | * | 9/1983 | Hoffman | C02F 1/22 203/DIG. 17 |

(Continued)

FOREIGN PATENT DOCUMENTS

FR           2210573          7/1974

*Primary Examiner* — Frantz F Jules
*Assistant Examiner* — Martha Tadesse
(74) *Attorney, Agent, or Firm* — McNees Wallace & Nurick

(57) ABSTRACT

A method of purifying brackish water includes mixing brackish water with a nucleating agent, forming nucleated liquid water and distributing droplets of the nucleated liquid water inside a vacuum chamber, vacuum freezing the droplets of the nucleated liquid water in the vacuum chamber. The method further includes the droplets forming pure water vapor, nucleated ice, and remaining brackish water, mixing and liquifying the pure water vapor and the nucleated ice, forming a mixture of purified liquid water and the nucleating agent. The method further includes separating the mixture of purified liquid water and the nucleating agent, forming purified liquid water and the nucleating agent.

22 Claims, 16 Drawing Sheets

(56) References Cited

U.S. PATENT DOCUMENTS

| | | | | |
|---|---|---|---|---|
| 4,637,217 | A * | 1/1987 | Owen | E02D 19/14 |
| | | | | 62/260 |
| 4,769,316 | A * | 9/1988 | Miyasaki | G03C 1/48584 |
| | | | | 430/592 |
| 4,810,274 | A | 3/1989 | Cheng et al. | |
| 5,111,768 | A * | 5/1992 | Larsson | G01K 11/06 |
| | | | | 374/E11.006 |
| 5,244,043 | A * | 9/1993 | Shuler | E21B 43/12 |
| | | | | 166/292 |
| 5,553,456 | A * | 9/1996 | McCormack | C02F 1/265 |
| | | | | 62/123 |
| 5,726,405 | A | 3/1998 | White | |
| 6,235,092 | B1 * | 5/2001 | Spencer | C10L 3/108 |
| | | | | 422/198 |
| 7,569,737 | B2 | 8/2009 | Phelps et al. | |
| 7,794,603 | B2 * | 9/2010 | Skjetne | C02F 1/26 |
| | | | | 62/541 |
| 8,048,309 | B2 * | 11/2011 | Osegovic | C02F 1/26 |
| | | | | 423/220 |
| 8,695,360 | B2 | 4/2014 | Enis et al. | |
| 8,863,547 | B2 | 10/2014 | Enis et al. | |
| 9,395,113 | B2 | 7/2016 | Dodson | |
| 2007/0295673 | A1 * | 12/2007 | Enis | C02F 1/22 |
| | | | | 210/170.11 |
| 2014/0223958 | A1 * | 8/2014 | McCormack | C02F 1/22 |
| | | | | 62/123 |
| 2018/0016160 | A1 * | 1/2018 | Enis | B01D 9/0009 |
| 2018/0127631 | A1 | 5/2018 | Kawahara | |

\* cited by examiner (ICE)

(AgI)

| Material | Crystal form | a (Å) | c (Å) | Basal misfit (%) | Prism misfit (%) |
|---|---|---|---|---|---|
| Ice | Hexagonal | 4.52 | 7.36 | - | - |
| AgI | Hexagonal | 4.58 | 7.49 | 1.4 | 1.6 |
| PbI$_2$ | Hexagonal | 4.54 | 6.86 | 0.5 | -3.6 |
| CuI | Hexagonal | 4.31 | 7.09 | -4.6 | -4.1 |

FIG. 6

VACUUM FREEZING NUCLEATED LIQUID WATER FOR PURIFYING BRACKISH WATER

STATEMENT REGARDING FEDERALLY SPONSORED RESEARCH

This invention was made with Government support under contract number DE-SC0015824 awarded by the Department of Energy. The Government has certain rights in the invention.

FIELD OF THE INVENTION

The present invention is directed to water desalination techniques/processes.

BACKGROUND OF THE INVENTION

Fresh water is a vital cornerstone of everything accomplished in modern society. Of all water in/on earth, 97% is contained in the oceans. The oceans represent a virtually unlimited supply of water, yet is unsuitable for human consumption without treatment. Thus, desalination techniques/processes are required in order to convert this vast volume of water into a usable resource.

By mechanism, desalination technology can be generally classified into two groups, thermal desalination and membrane desalination. The dominant thermal desalination technologies are multistage flash (MSF) and multi-effect distillation (MED), usually with thermovapor compression (MED-TVC). MSF is almost exclusively applied at a very large scale, and both MED and MSF are generally configured as water-power co-production systems. These systems typically utilize fossil fuel as a primary energy source, but also require significant amounts of electrical energy for water circulation. Some MED systems, at refineries for example, may not include power generation and may utilize lower grade thermal energy from other process steps. Membrane technology is dominated by reverse osmosis (RO), which is a highly scalable process used in applications ranging from systems small enough to fit under a kitchen counter to as large as 600,000 m³/day. RO is driven by electrical energy. Relative to other commonly deployed desalination systems, today's large RO plants have the highest thermodynamic efficiencies when considered in terms of either primary (fuel) energy or the thermal and/or electrical energy input to the desalination plant itself. Researchers have demonstrated that the energy cost percentages of the total costs for reverse osmosis and thermal desalination processes are about 44% and 50%, respectively, representing significant cost drivers to producing purified water. The high cost of energy highlights the need for a more efficient desalination method.

A wide variety of additional desalination technologies exist, at varying stages of maturity. Electrodialysis has been in use for brackish water for decades. Membrane distillation, thermolytic forward osmosis, and humidification-dehumidification are in early stages of industrial development, with advantages in important niche applications. None of these technologies have been deployed for large-scale seawater desalination, and in most cases the target applications are quite different. Research in this area is quite active to increase water recovery, reduce brine management costs, and lower energy requirements per unit water production.

Among the 3% of total water sources other than seawater, 2% is fresh water trapped in icecaps and glaciers by natural freezing desalination process, which is a key fresh water source in Scandinavian countries. Inspired by the natural process, the process of freezing desalination is developed based on the natural phenomenon of pure ice formation in a saline solution such as seawater. In this process, most impurities tend to remain in the liquid phase, leaving a pure solid phase. The phase change of water freezing requires the removal of the heat of fusion ($H_f$=334 kJ/kg) of ice. This heat is nearly ⅐ of the heat of vaporization of water ($H_{vap}$=2265 kJ/kg) at the same temperature and pressure.

Specifically, if the freezing desalination process operates at the triple point of water, vapor and crystalline ice are formed simultaneously from liquid without the need of external thermal energy, due to the energy balance of the endothermic vaporization and the exothermic freezing is expressed in equation (1):

$$m_s H_f = m_v H_{vap} \quad (1)$$

where $m_s$ and $m_v$ are the mass of ice and vapor generated from liquid phase, respectively. The net thermal energy consumption for the phase transition desalination processes is zero, and the amount of vapor to transport in the process is only about ⅛ of the total processing water, resulting in much less pumping power requirements. This low energy consumption is one of the main reasons for the continuous interest in vacuum freezing desalination. In addition, the low operation temperature (<0° C.) significantly reduces the corrosion issue, which enables the use of much lower cost engineering materials.

Vacuum freezing desalination systems aim to couple the evaporation and freezing of seawater droplets at its triple point to improve the energy efficiency. In a conventional prototype of a vacuum freezing desalination plant or system 10, the triple-point process is completed in a vacuum freezing chamber 12 as shown in FIG. 1. By drawing a vacuum in chamber 12, the evaporation of water (water vapor 14) removes heat from seawater 16 supplied to chamber 12 and decreases the temperature in chamber 12. When the temperature in chamber 12 drops below the freezing point of seawater 16, formation of ice 19 starts in random locations in chamber 12. An agitator 18 or scraper is used to break ice 19 and mix it with the liquid seawater 16 to form an ice slurry 20, which is then removed from chamber 12 for further treatment. Brine 22 is also removed from chamber 12 during the process.

Due to the potential advantages of vacuum freezing, these processes have been studied since the 1950s. Several pilot plants utilizing a vacuum-freezing desalination process had been designed and built in Israel and the United States. However, there has not yet been a successful commercial vacuum freezing process involving desalination.

Two major problems that prevent the application of vacuum freezing desalination include: a) the uncontrollable water freezing and ice transportation; and b) the high cost of vapor compression at near-vacuum pressure. FIG. 2a shows a scenario of the process that is similar to that shown in FIG. 1. However, in another scenario of the vacuum freezing desalination process as shown in FIG. 2b, seawater 16 and aqueous solutions do not readily freeze slightly below the triple-point temperature, but rather remain liquid 24 that is subcooled and metastable. It is reported that the metastable liquid water 24 exists as low as −38° C. The subcooled liquid water 24 has been one of the major issues in most freezing processes including those in freezing desalination, since it freezes randomly and turns to the stable solid phase (i.e., ice 19) with uncontrollable ice size and shape that induce difficulties in ice handling downstream.

In addition to the ice handling issue, the subcooling of water also increases the energy consumption on the side of vapor operation. The major energy consumption and principal difficulty in vacuum freezing processes is the handling of extremely large volumes of water vapor produced per unit of water. Even though only about ⅛ of vapor needs to be pressurized and condensed to liquid water compared with other thermal desalination techniques, the low pressure of vapor in the vacuum freezing desalination technologies increases the cost of vapor compression. In one example, Applicant conducted an experimental cost analysis involving, such as shown in FIG. 3, seawater with 3.5% impurities that would start freezing at −2.1° C. Assuming ⅓ of water is to be converted into freshwater by this desalination technology, the brine concentration would be 5.3%, the freezing temperature of which would drop to −3.1° C., due to higher impurity concentration, and the equilibrium triple-point vapor pressure would also drop to 460 Pa. This vapor would be condensed downstream on the surface of ice (also produced in the triple-point process) at or above the triple point of pure water (0.01° C., 612 Pa) in the regeneration chamber to produce liquid fresh water. Applicant concluded that the energy input for transporting the vapor from the vacuum freezing chamber at 460 Pa to the regeneration chamber at above 612 Pa is the driving force of the desalination process. Given the low pressure and density of water vapor in this process, the energy consumption for the vapor transportation process would be significant.

This energy requirement for vapor transportation is significantly increased as the subcooling required to freeze the water increases. In case of spray freezing of water droplets, water droplets may remain liquid until −10° C., where the surrounding vapor pressure is below 300 Pa, which requires more energy to pressurize and pump the vapor to the regeneration chamber. As a result, in conventional prototypes of vacuum freezing desalination, water was usually frozen in bulk water with existing ice blocks, so that subcooling is not an issue. Unfortunately, the difficulties in size and shape control of ice and the ice transportation and washing make this design impractical.

To prevent subcooling of water in the freezing chamber, several techniques have been developed. A straightforward series of methods use refrigerant to cool water directly or indirectly to overcome the subcooling temperature and maintain a continuous freezing. As an example, liquid natural gas can be used as refrigerant in contact freezing, where gas hydrates are crystalized at freezing, and gas vaporizes away at melting downstream to complete the cycle. Agitators may be used to provide fluctuation and suppress subcooling, such as shown in FIG. 1. Even though the latent heat of fusion is much lower than that of vaporization for natural gas, energy consumption remains large in this process because of the lack of proper thermal energy recovery and reuse. In addition, the size and shape of the frozen blocks is incontrollable, inducing ice handling problems downstream.

Desalination techniques and processes that show one or more improvements in comparison to the prior art would be desirable in the art.

SUMMARY OF THE INVENTION

To address the issues of ice handling in the vacuum freezing desalination process, Applicant has developed a method to control the ice freezing process and ice particle size by using nucleating agents in a spray freezing system of seawater in the vacuum freezing chamber. In this process, the size distribution of ice is directly related to the size distribution of the water droplets. With the use of a seawater spray freezing system instead of a direct contact freezing system of bulk water, the size distribution of droplets can be controlled for ice handling downstream. A side effect of the spray system is that the small size of water droplets may induce more significant subcooling of water, as shown in FIG. 2b. The subcooling of water will significantly increase the cost of energy for vapor compressing and transportation in a vacuum freezing desalination process. Applicant has investigated the feasibility of the vacuum freezing desalination system at different subcooling conditions of water. Applicant has found that to meet the energy requirement of the current market of desalination, the subcooling of water must be maintained at or below 2° C.

In an embodiment, a method of purifying brackish water includes mixing brackish water with a nucleating agent, forming nucleated liquid water, and distributing droplets of the nucleated liquid water inside a vacuum chamber. The method further includes vacuum freezing the droplets of the nucleated liquid water in the vacuum chamber, the droplets forming pure water vapor, nucleated ice, and remaining brackish water. The method further includes mixing and liquifying the pure water vapor and the nucleated ice, forming a mixture of purified liquid water and the nucleating agent, and separating the mixture of purified liquid water and the nucleating agent, forming purified liquid water and the nucleating agent.

In another embodiment, a method of purifying brackish water includes mixing brackish water with a nucleating agent, forming nucleated liquid water, and distributing droplets of the nucleated liquid water inside a vacuum chamber. The method further includes vacuum freezing the droplets of the nucleated liquid water in the vacuum chamber at or below a temperature and pressure corresponding to a triple point of water, the droplets forming pure water vapor, nucleated ice, and remaining brackish water. The method further includes mixing and liquifying the pure water vapor and the nucleated ice, forming a mixture of purified liquid water and the nucleating agent, and separating the mixture of purified liquid water and the nucleating agent, forming purified liquid water and the nucleating agent.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 6 shows parameters of various materials in a tabular format.

Wherever possible, the same reference numbers will be used throughout the drawings to represent the same parts.

DETAILED DESCRIPTION OF THE INVENTION

Figure 1:
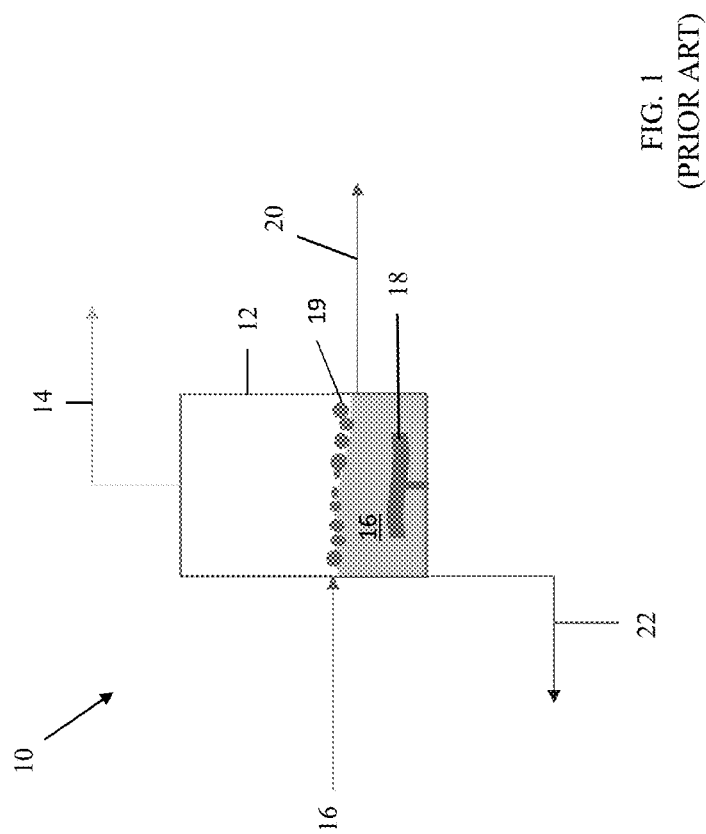
FIG. 1 is a schematic view of a known vacuum freezing desalination system.
Figure 2:
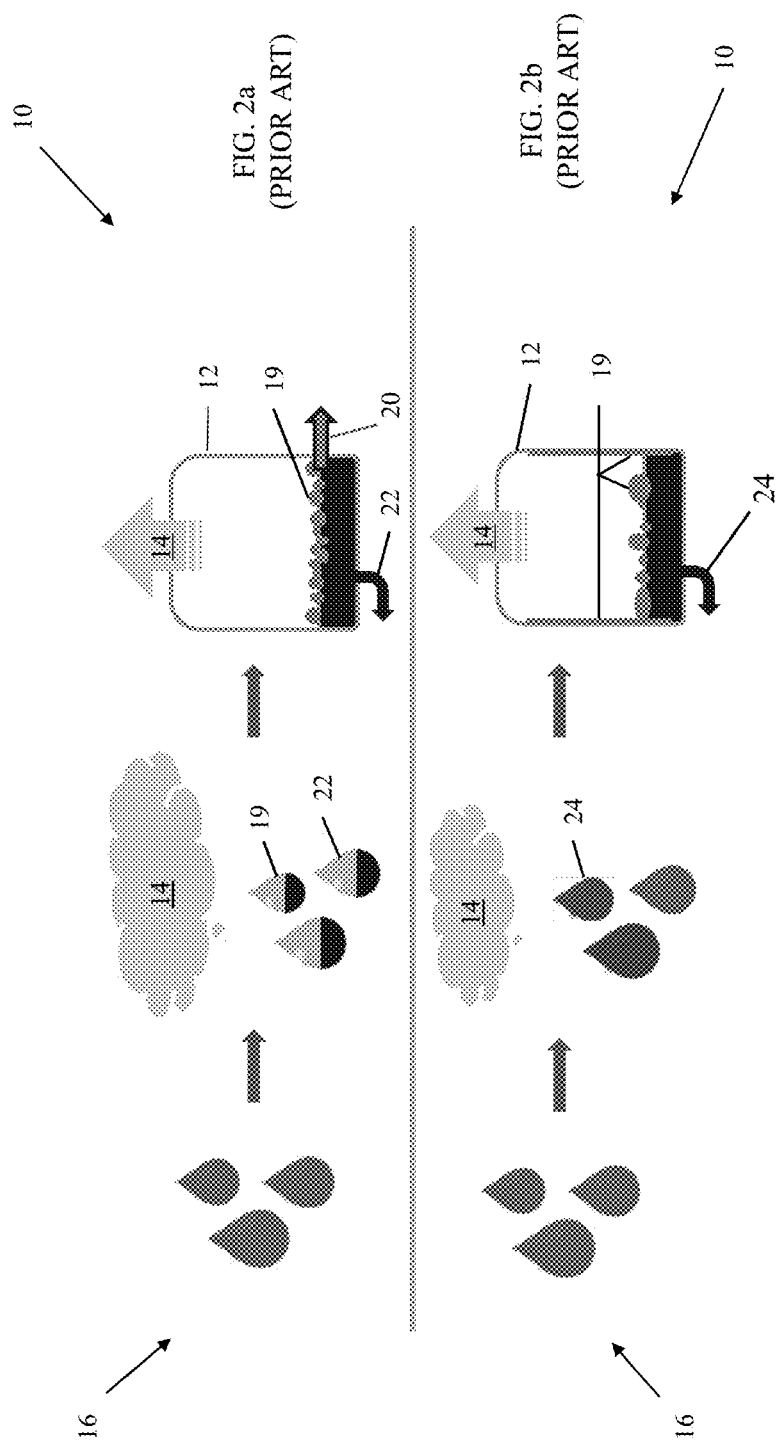
FIG. 2a is a schematic view of a flowchart for a known ideal vacuum freezing system with no subcooling of freezing.
FIG. 2b is a schematic view of a flowchart for a known vacuum freezing system with the existence of subcooling of freezing, which prevents the freezing of ice in the spray water droplets.

The present invention utilizes one or more nucleating agents to suppress the subcooling of water. The term "agents," "agent," and "agent(s)" and the like may be used interchangeably. Generally, nucleating agents such as ice nucleating agents are particles or structures (such as a monolayer) that accelerate the ice nucleation process by providing surfaces that facilitate the formation of the first ice crystal. Even though the mechanics behind some of the subcooling suppression remains unclear, it is widely accepted that the nucleating agent should have similar crystal structure as the hexagonal crystal structure of ice. The similarity can be based from the body crystal structure of the nucleating agent or at least one face of the crystal, so as to lower the energy required to initiate ice nuclei larger than the critical nucleus radius, which is defined as the minimum size that must be formed by atoms or molecules clustering together (in a gas, liquid or solid matrix) before a new-phase inclusion (e.g., a bubble, a droplet, or a solid particle) is stable and begins to grow, with formation of such stable "nuclei" is called nucleation, which ice nuclei is typically several angstroms. One example of a nucleating agent is silver iodide (AgI) that is widely used in cloud seeding for rainmaking. It is reported by Weather Modification Association (WMA, 2009) that due to the stability of AgI in water, no environmentally harmful effects arising from cloud seeding with AgI aerosols have been observed, nor would they be expected to occur. Similarly, with reliable separation techniques provided by industry, AgI is also a good candidate as a nucleating agent for vacuum freezing of water.

In this invention, Applicant applied a nucleating agent(s) adapted to suppress subcooling of water to the spray vacuum freezing system to lower the subcooling temperature of the mixture of water and the nucleation agent(s) and increase its equilibrium pressure during the vacuum freezing process. The triple-point process that converts liquid water to ice and vapor is enhanced by spraying or dripping brackish water into the vacuum freezing chamber instead of converting in a cooling bath, so that the surface area of the transitioning solid phase is increased and conversion rate and efficiency can be enhanced. The subcooling suppression of the single droplets, which was unachievable in conventional systems, can be achieved with the use of nucleating agent particles in the brackish water. The nucleating agents feature a similar crystal structure with ice and hydrophilicity, which is a tendency to mix with, dissolve in, or be wetted by water, so that the freezing process can occur on the surface of the nucleating agent(s) suppressing subcooling of the droplets, thereby overcoming a significant potential barrier for ice nuclei formation. The subcooling suppression can be tested with a Differential Scanning Calorimeter (DSC), in which the difference in the amount of heat required to increase the temperature of a sample of (nucleated) water in a sample holder and a reference (empty sample holder) is measured as a function of temperature. The melting and freezing processes of the samples without and with AgI were measured using a DSC and shown in FIG. 4, which was conducted under ambient pressure. That is, line 26 corresponds to pure water, line 28 corresponds to pure water with AgI, and line 30 corresponds to pure water with $Ag_{0.7}Cu_{0.3}I$. Applicant has found that without a nucleating agent, the subcooling of water is as large as 21° C. as shown at point 32 (i.e., water does not freeze until −21° C., which is 21° C. below its thermodynamic melting point of 0° C.), while AgI as the nucleating agent can suppress the subcooling to 3.2° C. as shown at point 35. Note that this subcooling temperature is still higher than the acceptable degree of subcooling (<2° C.).

For purposes herein, the term "brackish water" and the like is intended to mean water containing impurities of any concentration, such as salt, that may be removed by a vacuum freezing process.

Figure 5B:
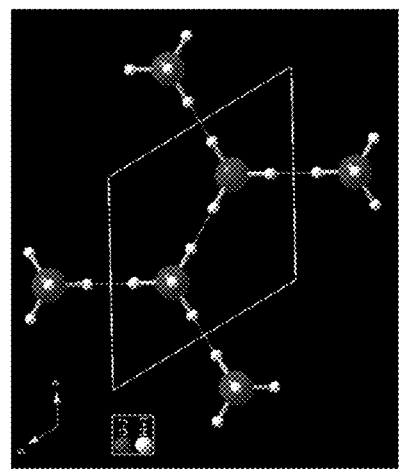
FIG. 5b is a depiction of crystal structures of ice.
Figure 5A:
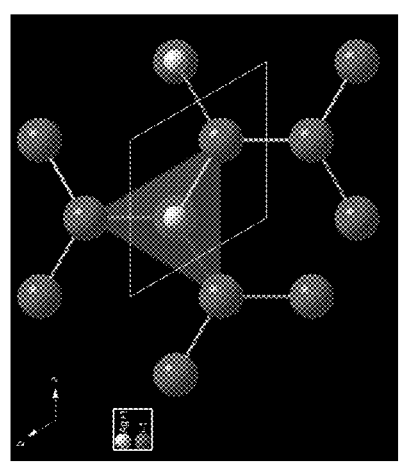
FIG. 5a is a depiction of crystal structures of AgI.

The subcooling can be further suppressed by tuning the lattice parameters of the nucleating agent. In brief, good nucleating agents for water should have crystal lattice parameters similar to that of ice. FIGS. 5a and 5b show the similarity of crystal structures between ice (FIG. 5b) and AgI (FIG. 5a), which explains the performance of AgI as a nucleating agent for water subcooling suppression. However, this crystal structure needs to be further manipulated for better subcooling suppression performance.

Applicant has identified, as a result of searching X-ray crystallographic data, three substances with similar crystal structure compared to ice for initial investigation: silver iodide (AgI), lead iodide ($PbI_2$), and copper iodide (CuI). The lattice parameters of the substances are listed in FIG. 6. Applicant has found that the lattice parameter of CuI is smaller compared to the lattice parameter of ice, and AgI has a larger lattice parameter than ice. According to Vigard's law, by doping Cu in AgI, a solid solution of $Ag_xCu_{1-x}I$ can be formed with same crystal structure, and the lattice parameter of the solid solution crystal is a function to the doping ratio (1−x) as shown in equation (2):

$$a_{A_{1-x}B_x} = (1-x)a_A + xa_B \quad (2)$$

As a result, in order to match the lattice parameter of ice, the doping ratio of copper (1−x) should be approximately 0.3. The desired nucleating agent $Ag_{0.7}Cu_{0.3}I$ can be synthesized following the known sol-gel methods (which will not be discussed) with modification, which is further discussed. The chemicals involve in the synthesis include reagent grade silver nitrate ($AgNO_3$), copper(II) nitrate hemi(pentahydrate) ($CuN_2O_6 \cdot 2.5H_2O$), and potassium iodide (KI). The chosen amount of each reagent depends on the doping ratio x in $Ag_xCu_{1-x}I$. First, the silver nitrate and copper(II) nitrate was dissolved together in water. In a separate container, potassium iodide was also dissolved with water. Slowly mixing these two solutes produces $Ag_xCu_{1-x}I$ at designed x value. For particle size and shape control, the temperature and concentration of the reagents were carefully controlled, and chelating agents such as citric acid may also be used in order to maintain low metal ion concentration during the reaction. The chemical processes in the synthesis is illustrated as follows in equation (3):

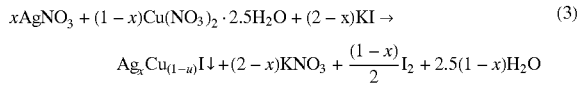

$$xAgNO_3 + (1-x)Cu(NO_3)_2 \cdot 2.5H_2O + (2-x)KI \rightarrow \quad (3)$$
$$Ag_xCu_{(1-a)}I\downarrow + (2-x)KNO_3 + \frac{(1-x)}{2}I_2 + 2.5(1-x)H_2O$$

The process takes up to about 30 minutes to complete the reaction. The product was then filtered and dried to obtain a final sample of the nucleating agents.

Figure 4:
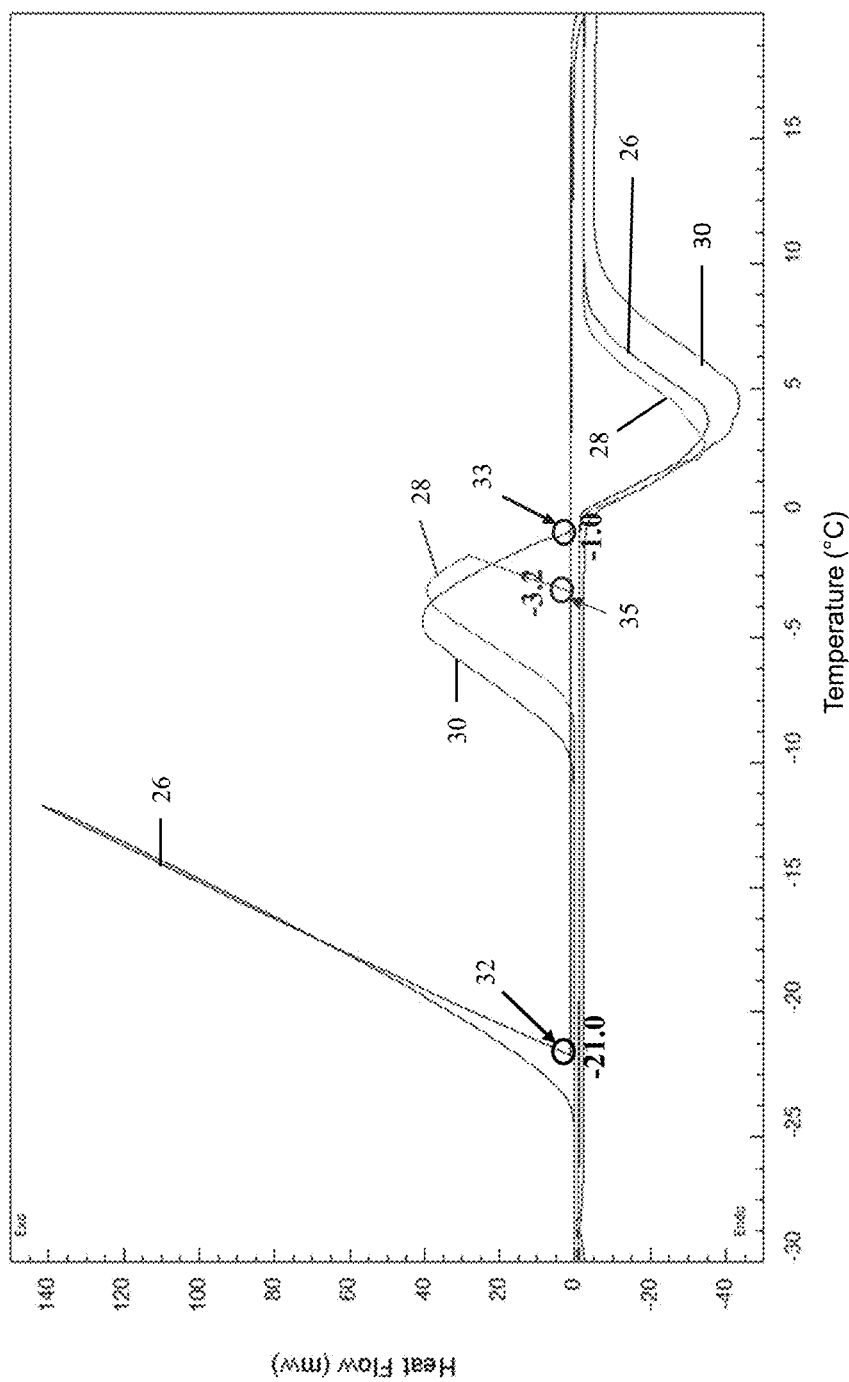
FIG. 4 is a graphical depiction of heat flow versus temperature for water and water in combination with different nucleating agents. The onset points of the freezing curve represent the freezing temperature.
Figure 7:
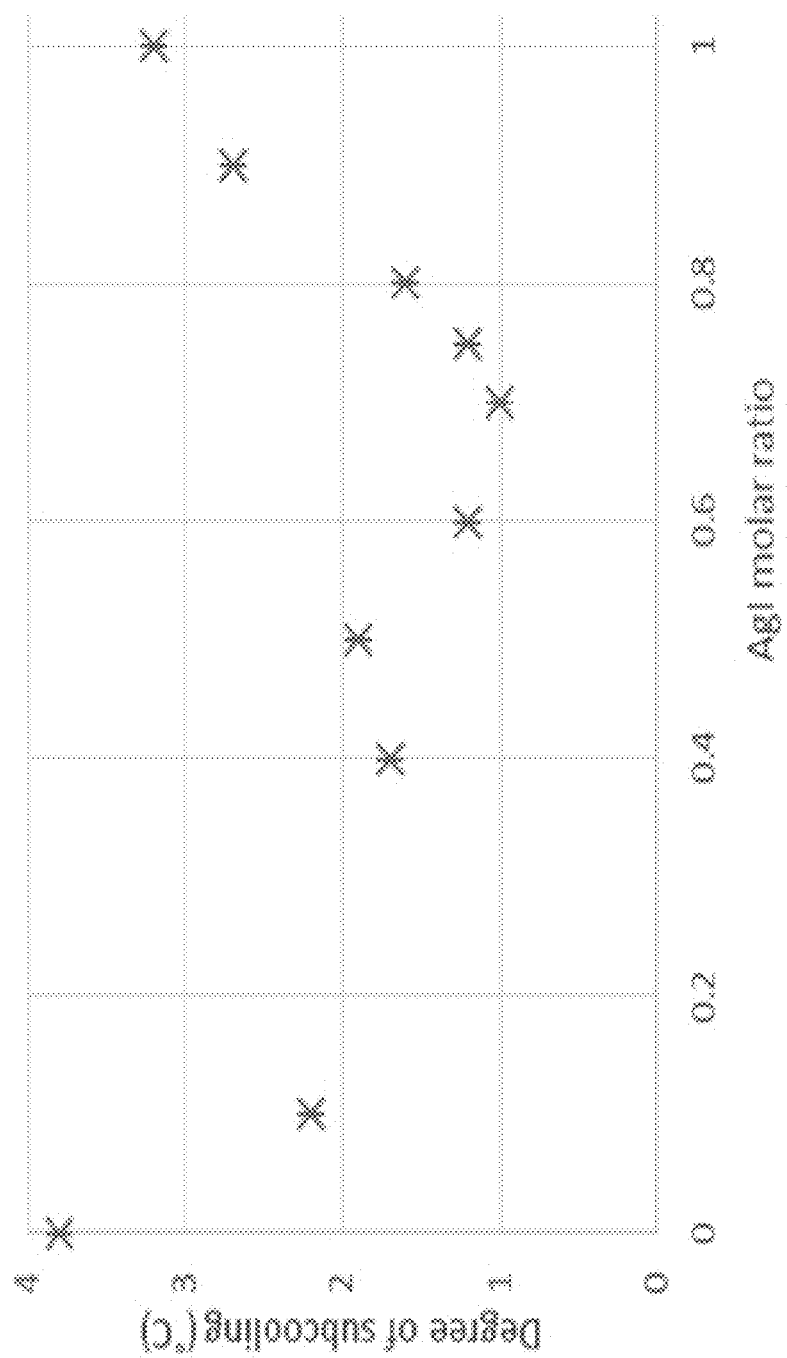
FIG. 7 is a graphical depiction of subcooling versus molar ratio of an exemplary nucleating agent.

As shown in FIG. 4, tests of water with the produced nucleating agents reveal their capability of subcooling suppression. It was found that after being properly doped with copper, the capability of subcooling suppression of the AgI-based nucleating agents is significantly improved. Detailed results of the nucleating agent samples are shown in FIG. 7. Among all the samples, $Ag_{0.7}Cu_{0.3}I$ with doping ratio of 0.3 provides the best subcooling suppression, reduced the subcooling of pure water to 1.0° C. This result is also shown at point 33 of line 30 in FIG. 4.

Figure 3:
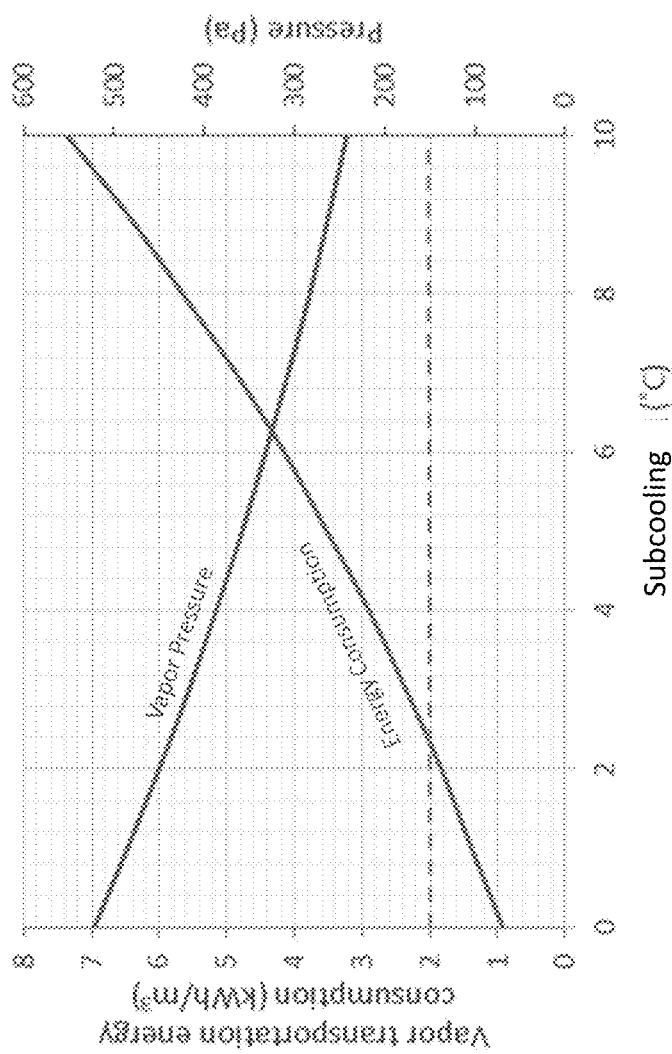
FIG. 3 is a graphical depiction of vapor transportation energy consumption and pressure versus subcooling for a vacuum freezing desalination system.

The tuned nucleating agent is then used in the test of vacuum freezing process. Referring to FIG. 3, as the vapor pressure drops in the vacuum chamber, temperature of water also drops both on the surface and in bulk water due to the evaporation of water. The vapor pressure continues to drop to lower than the triple-point pressure 620 Pa, which brings the surface temperature of water below the triple-point temperature 0.01° C. As a result of subcooling, the surface water under the low pressure is not frozen immediately after the triple-point temperature is reached. The subcooling condition of pure water is briefly maintained until a lower limit of temperature at the metastable status is reached, when freezing of the water starts from a random spot on the surface of the water. The difference between the lower limit of temperature at the metastable status and the triple-point temperature is the subcooling of water in this test, which is about 4° C. The subcooling of bulk water freezing is much smaller than that of droplet freezing, as the large volume of the sample provides more probability to initiate the freezing process by random formation of initial ice nuclei.

Figure 8A:
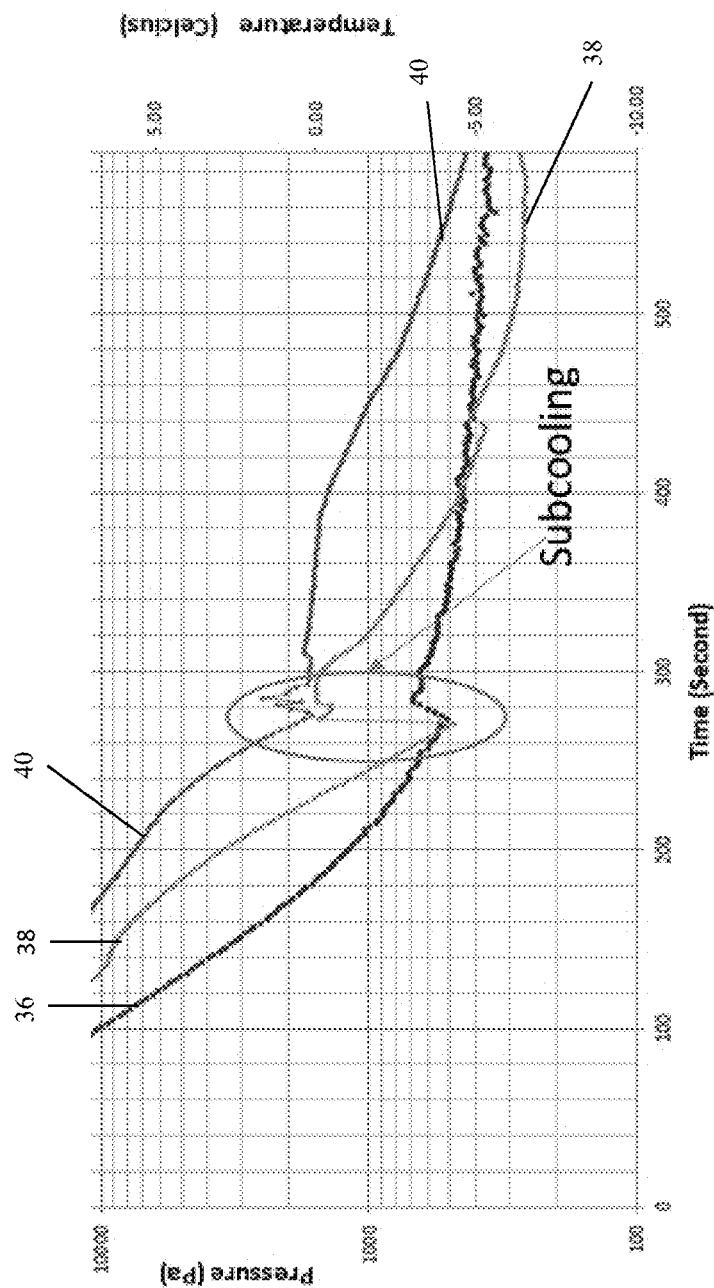
FIG. 8a is a graphical depiction of pressure and temperature versus time for a vacuum freezing process for water.
Figure 8B:
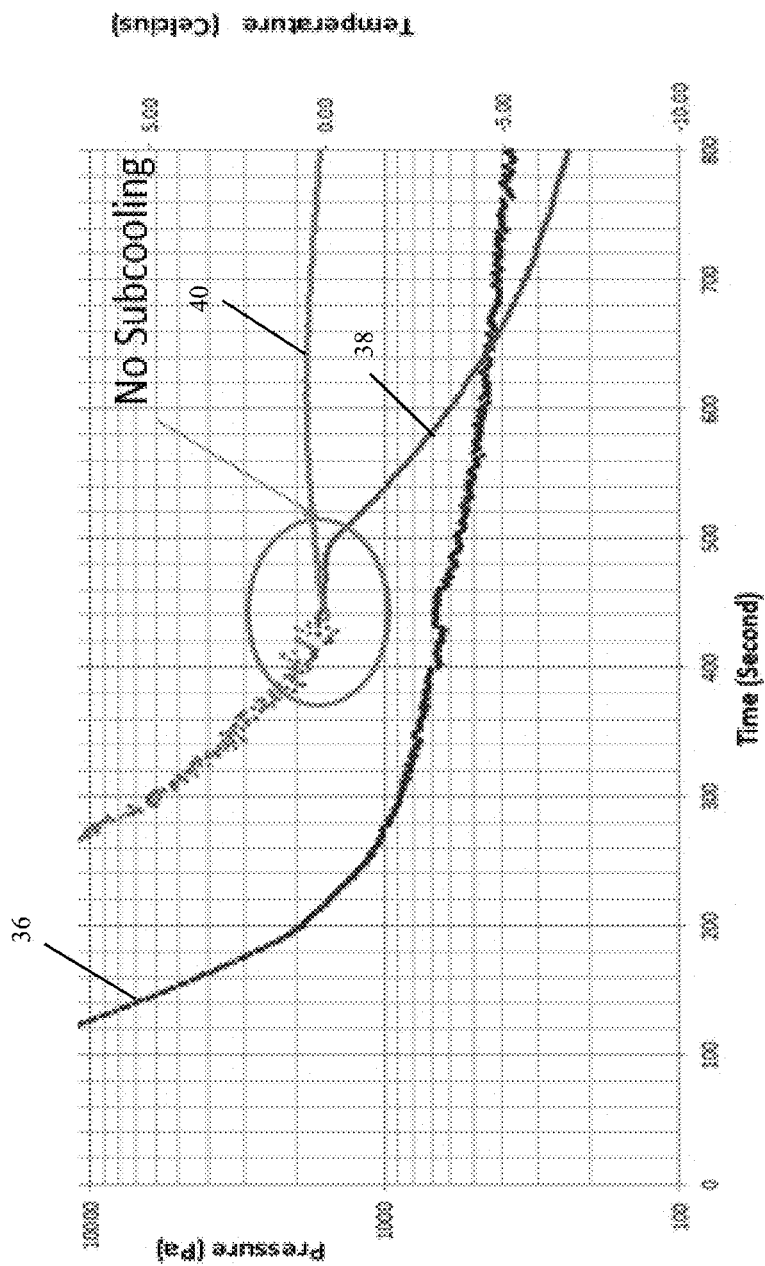
FIG. 8b is a graphical depiction of pressure and temperature versus time for a vacuum freezing process of water with an exemplary nucleating agent.

The amount of subcooling of water resulting from the use of doped nucleating agent(s) during vacuum freezing is much smaller compared to the amount of subcooling resulting from the use of bulk water. Initially, for both scenarios (water with doped nucleating agent(s) and water without doped nucleating agent(s)) temperature drops as pressure decreases in the beginning of the vacuum freezing process. However, when pressure reaches the triple point of water, water on the surface also reaches the freezing temperature and starts to freeze immediately, with little or no subcooling, which is also lower than the 1° C. subcooling of similar samples in the droplet freezing test in FIG. 4, because of the same reason that bulk water provides a greater probability of ice nuclei formation in which lines 36 correspond to pressure and lines 38 corresponding to surface temperature and lines 40 correspond to bulk temperature of water/water with doped nucleating agent(s). Comparing the results of testing as shown in FIGS. 8a (water) and 8b (water with doped nucleating agent(s)), it can be concluded that the nucleating agent(s) function not only in the freezing process induced by temperature drop at atmosphere pressure (FIGS. 8a, 8b), but also works in the freezing processes induced by evaporative cooling under vacuum (FIG. 4).

Figure 9:
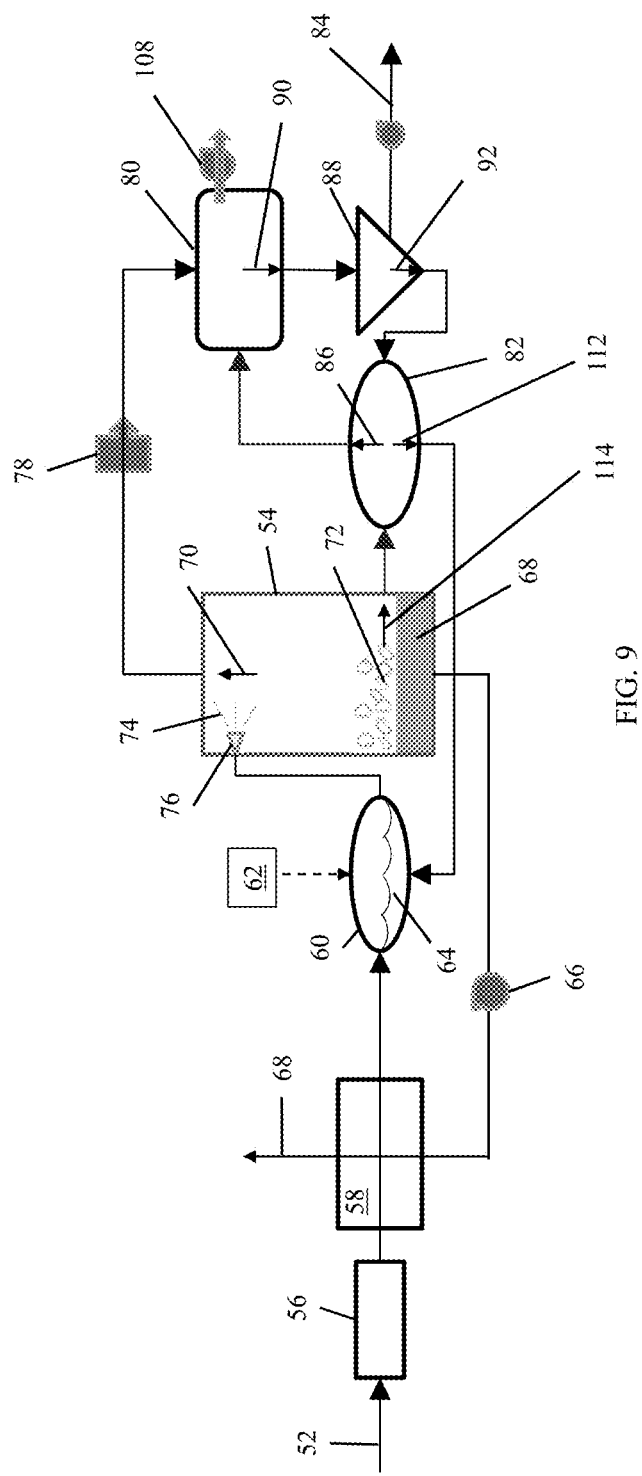
FIG. 9 is a flowchart of an exemplary vacuum freezing desalination system.
Figure 10:
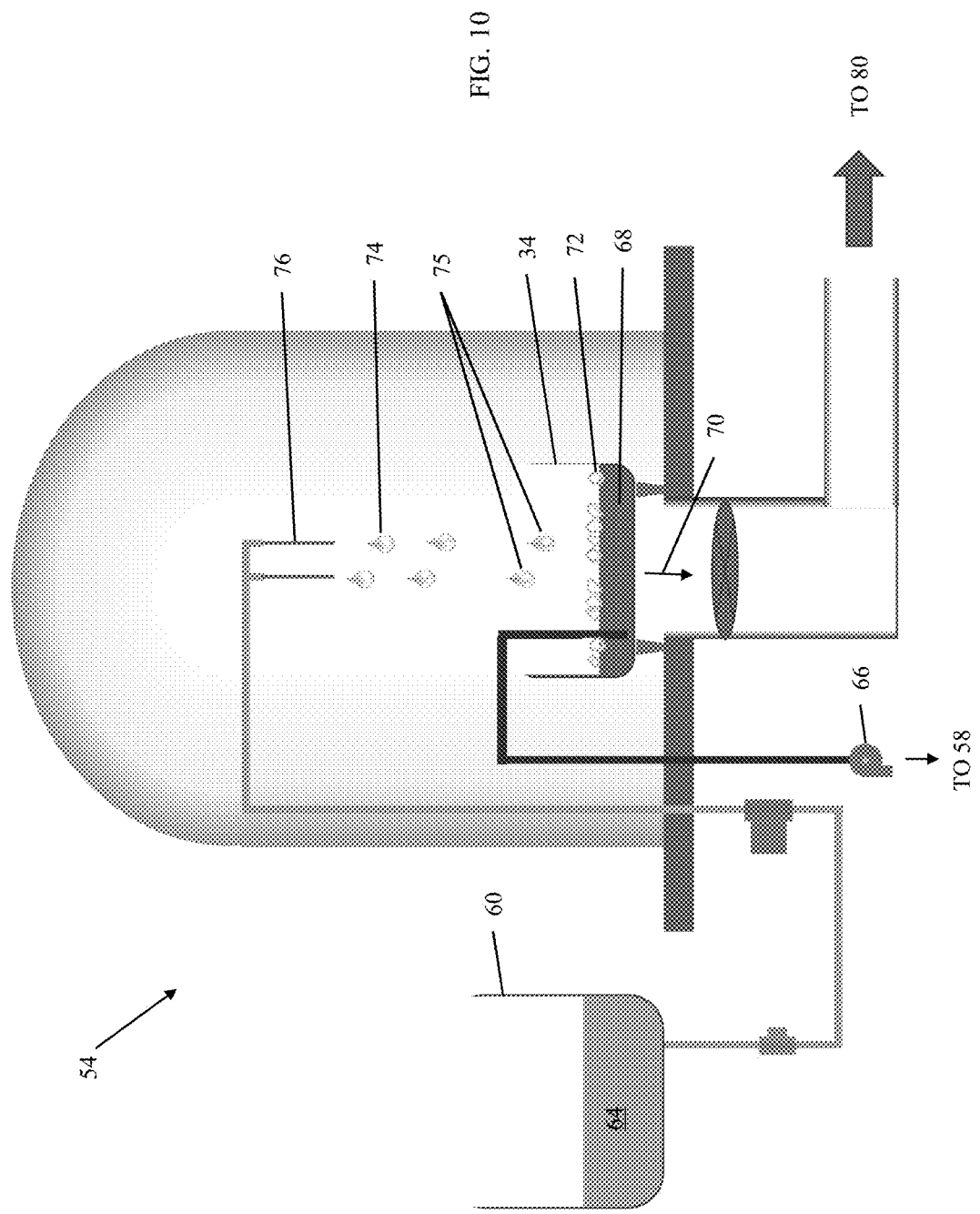
FIG. 10 is a schematic view of the flowchart of FIG. 9.

Based on the subcooling suppression capability of the doped nucleating agent(s), an exemplary system 50 directed to vacuum spray freezing impurity removal, such as for desalination is developed and presented in FIGS. 9, 10, 13 and 14. In this system 50, brackish water 52, which may include seawater, is sprayed or dripped into the chamber or vacuum freezing chamber 54 after pretreatment (deaerator 56, heat exchanger 58) and mixing via mixer 60 with nucleating agent(s) 62, becoming nucleated liquid brackish water or nucleated liquid water 64. Particles of nucleating agent(s) 62 are about 50 nanometers, between about 50 nanometers and about 0.1 mm, between about 50 micrometers and about 0.1 mm, between about 500 micrometers and about 0.1 mm, about 0.1 mm, and any subrange between about 50 nanometers and about 0.1 mm. Nucleating agent(s) 62, which may be added to mixer 60 separately, at least initially, is also received from a washer 82. The nucleated liquid water 64 is vacuum frozen in the chamber 54, and converted into pure vapor 70 and nucleated ice 72, or high purity ice containing nucleating agent(s) 72. The pure vapor 70 forms on the surface of the liquid water droplets 74, and the nucleated ice 72 forms on the surface of nucleating agent(s) in the droplets 74 in chamber 54 as schematically shown in FIG. 10, for at least a portion of water droplets 74, nucleated ice 72 begins to form as the droplets 74 move by vertical gravity between distributor 76 (such as a nozzle) and container 34. A portion of the liquid water in the liquid water droplets 74 of the nucleated liquid water 64 is consumed, the impurity concentration in the remaining brackish water droplets collecting as a result of gravity in chamber 54 increases, and the triple-point temperature and pressure of the remaining liquid brackish water decreases. The conversion process reaches equilibrium when the designed or predetermined temperature and pressure are achieved in chamber 54, and the liquid water droplets 74 of nucleated liquid water 64 are converted into pure vapor 70, nucleated ice 72 with enclosed particles of nucleating agent(s) 62, and remaining brackish water 68 or concentrated brine or brine. The pure vapor 70 is then pumped via pump 78 to a water regeneration chamber or regenerator 80 (schematically shown in FIG. 13); the nucleated ice 72, with a portion of waste or remaining brackish water 68, forming a mixture 114, is transported into a washer 82 where the remaining brackish water 68 is removed by washing or flooding purified liquid water 84 that has passed through a desilter 88. The mixture 86 of washed nucleated ice 72 with a portion of purified liquid water 84 is then transported from washer 82 into water regenerator 80, in which the temperature and pressure are higher than the triple point of pure water, so that a mixture 90 of pure liquid water (with nucleating agents) can be regenerated from mixture 86. The particles of nucleating agent 62 are then separated from nucleated liquid water 64 and re-mixed with fresh inlet brackish water 52, therefore purified liquid water 84 is produced.

For purposes herein, the term "pure water vapor" and the like is intended to mean water that is at least essentially, if not entirely, free of impurities, such as salt, that are removable as a result of vacuum freezing.

For purposes herein, the term "purified liquid water" and the like is intended to mean liquid water that is produced subsequent to removal of impurities by spray vacuum freezing, or the end product as a result of the system of the present invention.

Deaerator 56 is a device that is widely used in the industry for the removal of oxygen and other dissolved gases from feed brackish water 52 prior to reaching vacuum freezing chamber 54 and is not further discussed herein.

Heat Exchanger 58 (FIG. 9). In the heat exchanger 58 the brackish water 52 feed is pre-cooled by waste or remaining brackish water 68 commonly referred to as brine that is discarded from the vacuum freezing chamber 54 and moved via pump 66 into thermal communication with feed brackish water 52 in heat exchanger 58 for recovering energy to reduce the amount of expended energy associated with pumping, such as pumping pure vapor 70.

Mixer 60 (FIG. 9). In the mixer 60, feed brackish water 52, to which nucleating agent(s) 62 may be added, is pre-mixed with a slurry 112 from regenerator 80 at a predetermined ratio, becoming nucleated liquid water 64 that is provided to vacuum freezing chamber 54 for vacuum spray freezing.

Vacuum Freezing Chamber 54. Contrary to conventional freezing desalination techniques involving a cooling source in bulk water, the system of the present invention involves spray freezing in the vacuum freezing chamber 54 (FIGS. 9, 10). As further shown in FIG. 9, nucleated liquid water 64 is sprayed into the vacuum chamber 54 to start vacuum freezing. In one embodiment, chamber pressure is maintained below 460 Pa, so that the pre-cooled, sprayed droplets 74 of nucleated liquid water 64 having 3.5% impurities, e.g., salt, can still be vaporized. The vaporization removes heat from the droplets 74, cooling the droplets 74 to the freezing point of the nucleated liquid brackish water 64. As a result of the nucleating agent(s) 62, subcooling is suppressed, and freezing of pure water from the nucleated liquid brackish water 64 occurs. The latent heat of vaporization and the latent heat of freezing are thus balanced at the triple point of the droplets 74 of the nucleated liquid water 64. Due to the removal of pure water from the droplets 74 as a result of at least partial freezing and vaporization of the droplets 74, the impurities concentration of the remaining liquid portions of droplets 74 increases gradually, collecting as a result of gravity in chamber 54, becoming remaining brackish water 68 or concentrated brine. The final impurities concentration of the remaining brackish water 68 is determined by the vapor pressure maintained by the vapor pump 78 downstream. In one embodiment, the spray freezing process at 460 Pa, about ⅓ of pure water is removed from droplets 74 in the form of vapor and ice, in which about ⅛ of the removed water is converted to pure vapor 70 and the remaining about ⅞ of the droplets 74 are converted to well-sized nucleated ice 72 comprised of ice crystals with nucleating agent(s) 62 at the cores of the crystals, and remaining brackish water 68. In one embodiment, nucleated ice 72 is between about 20 and about 1500 microns, depending upon the distributor 76 used. In one embodiment, nucleated ice 72 is between about 5 percent and about 50 percent of the original droplet size. The remaining brackish water 68 is then sent to the heat exchanger 58 to pre-cool the feed brackish water 52 before being discarded.

Vapor Pump 78 (FIGS. 11, 12) transports low-pressure vapor 70 from vacuum freezing chamber 54 to water regenerator 80 while maintaining the pressure in vacuum chamber 54. Various apparatus can be used for the vapor transportation between vacuum freezing chamber 54 and regenerator 80, including but not limited to turbine, pump, blower, ejector, a combination thereof etc. In one embodiment, the system incorporates a specially configured vacuum ejector or thermal ejector or ejector 94 having peculiar operating performance, i.e., creating an extremely low pressure in the suction vacuum chamber 54 to allow the freezing removal of impurities, e.g., desalination to occur. The motive flow of ejector 94 can be driven by a thermal energy source 112 (FIG. 12), such as solar or any low-grade heat source, such as a steam turbine or cooling tower, that maintains an operating temperature of ejector 94 of greater than 120° C. to maintain the low pressure. In one embodiment, thermal energy source 112 is less than or equal to 120° C. In one embodiment, thermal energy source 112 is between about 75° C. and 120° C. In one embodiment, with an optimized ejector design, thermal energy source 112 may only need to maintain an operating temperature of the ejector 94 at about 75° C.

Figure 11:
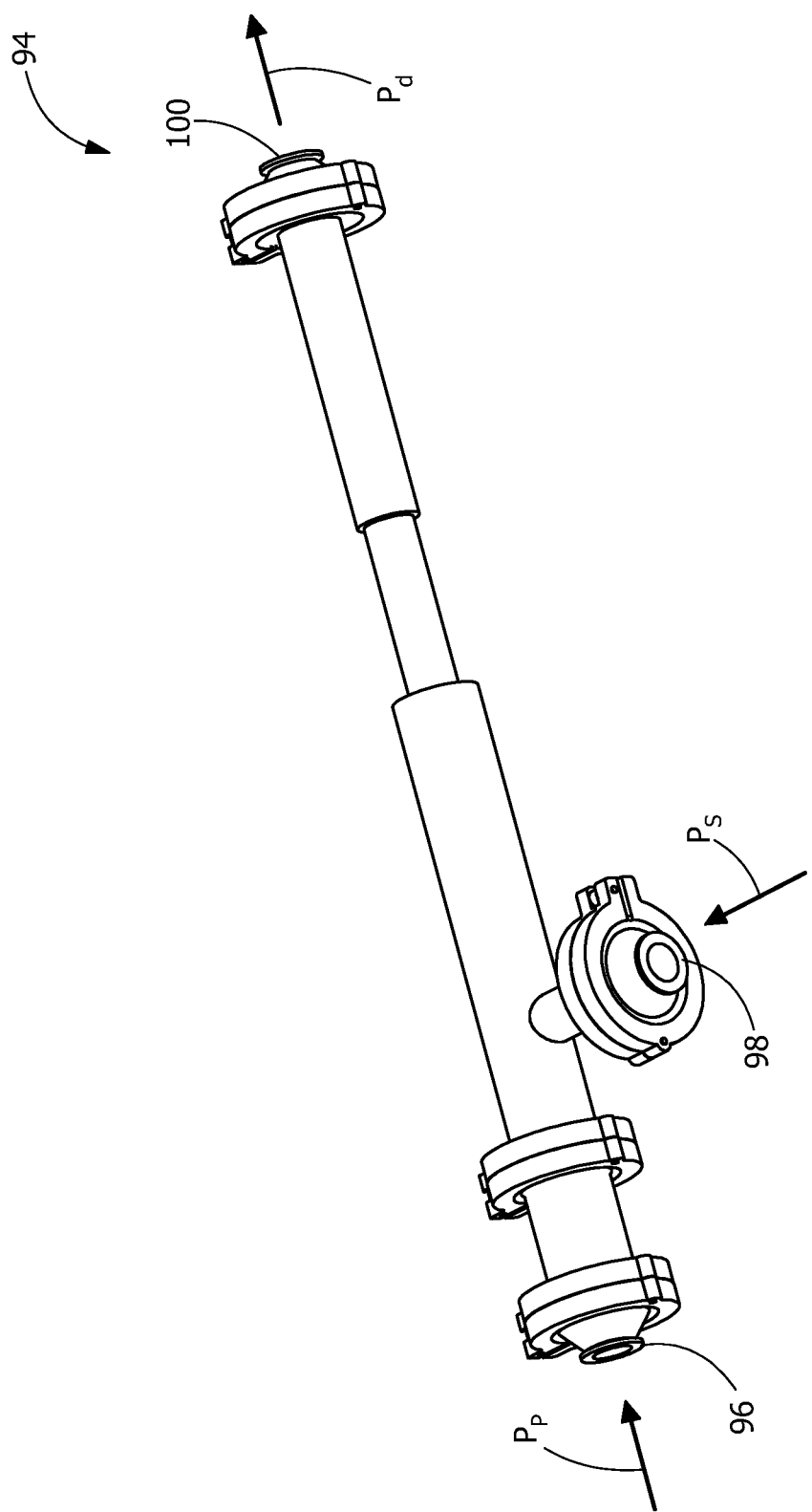
FIG. 11 is an upper perspective view of an exemplary thermal ejector.
Figure 12:
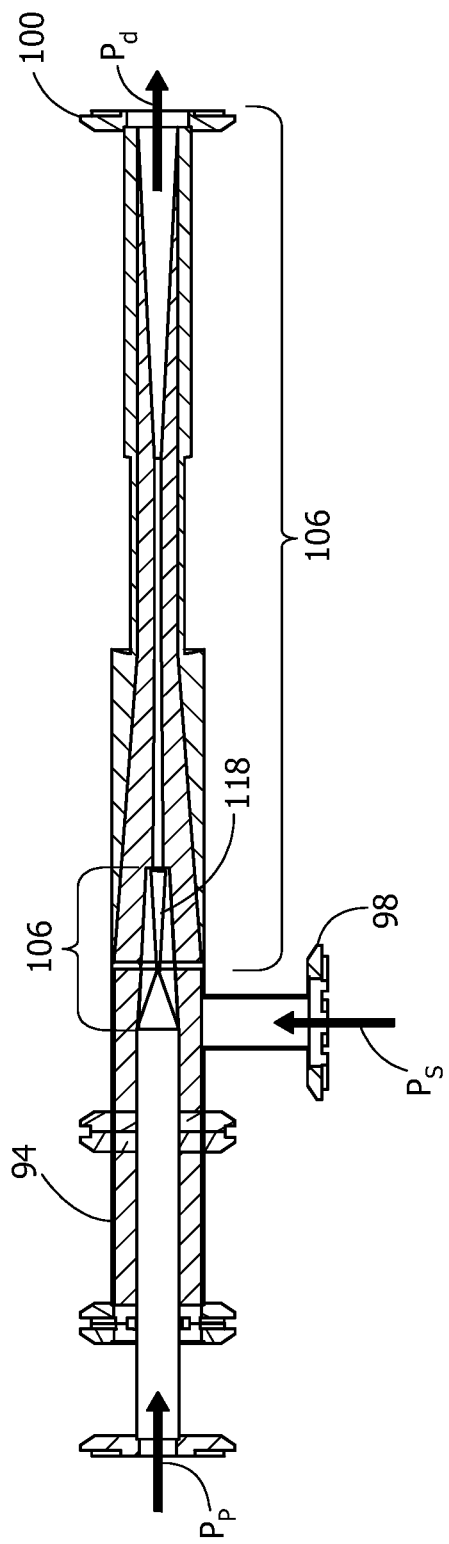
FIG. 12 is a cutaway view of the thermal ejector of FIG. 11.
Figure 13:
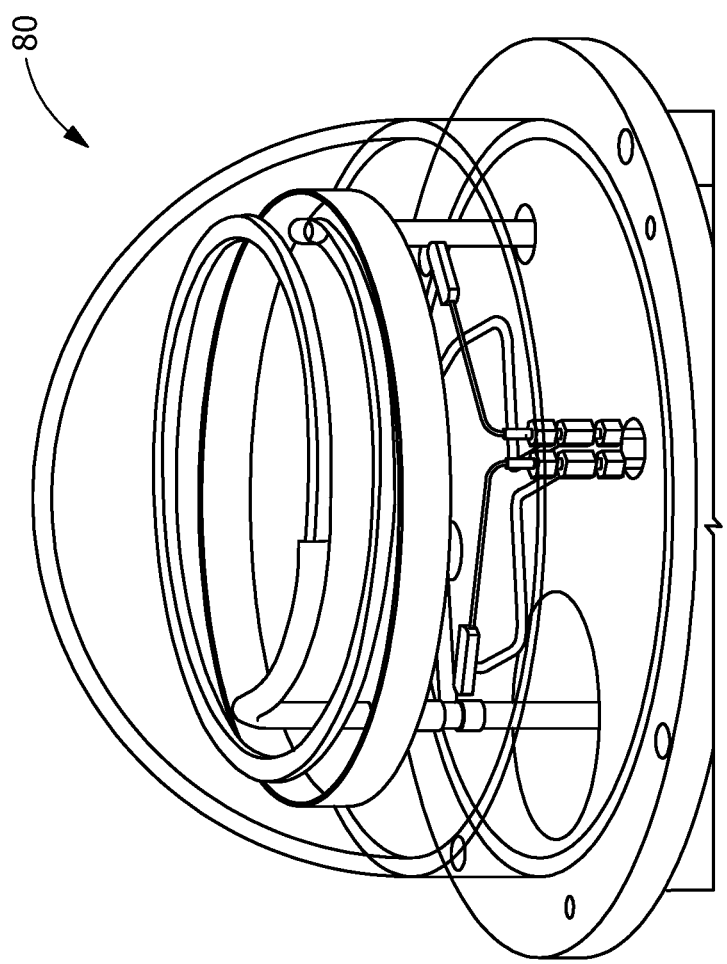
FIG. 13 is a schematic view of an exemplary water regeneration chamber.
Figure 14:
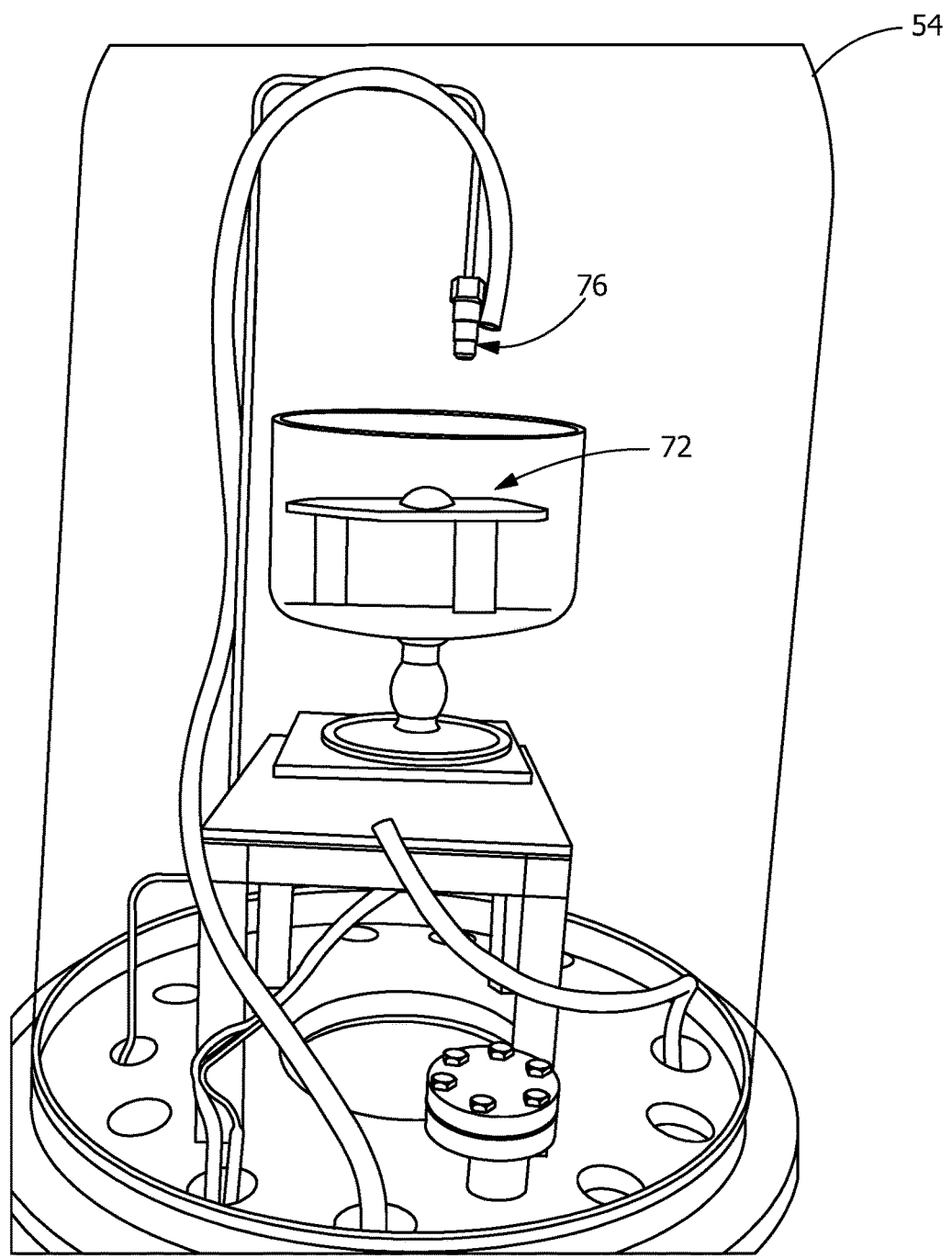
FIG. 14 is an exemplary water regeneration chamber.

As shown in FIG. 11, there are three ports 96, 98, 100 in the ejector 94. The pressures at each corresponding port are labeled as $P_p$, primary (or motive) flow pressure (port 96), $P_s$, suction flow pressure, and $P_d$, discharge flow pressure (port 100). As shown in FIG. 12, the primary flow from port 96 passes through a converge-diverge nozzle 106 before passing through a diffuser 110 and exiting through discharge port 100. The flow at least approaches, and may achieve a sonic condition (e.g., Mach number Ma=1, the flow speed equals to the sound speed) at the throat of nozzle 106. In other words, the pressure energy of the flow is partially converted to the kinetic energy. The flow reaches maximum speed and the pressure reaches minimum at the outlet of converge-diverge nozzle 106. When the pressure at the suction port 98 is higher than the pressure at the outlet of nozzle 106, the fluid in the freezing chamber 54 that connected with the suction port 98 will be drawn into the ejector and mixed with the primary flow at port 96. For the vacuum freezing desalination process, the pressure in the freezing chamber 54 is quite low, which imposes a big challenge on ejector 94 as flow passing through ejector 94 must achieve an even lower pressure at the outlet of nozzle 106. The specially configured ejector 94 has an extremely narrow throat area and thus a high nozzle exit-to-throat area ratio. The exit-to-throat area ratio can range from 10 to theoretically an extremely large number, as long as the space limitation is not a concern. However, the angle between the nozzle axis and nozzle wall in a diverging portion 118 of nozzle 106 should be maintained at about 5 degrees, so that the supersonic flow or near supersonic flow is continuously accelerating in this diverging region and the entropy generation of flow is also minimized, which results in a high Mach number at the outlet of nozzle 106. The high Mach number and well-controlled pressures at port 96 and port 100 corresponding to regenerator 80 (FIG. 9) could lead to an extremely low pressure at the outlet of nozzle 106. Therefore, this specially configured thermal ejector 94 is critical for creating an ultralow pressure to allow the freezing desalination to occur and transferring the vapor from the vacuum freezing chamber 54 to regenerator 80 (FIG. 9) for collection.

Figure 15:
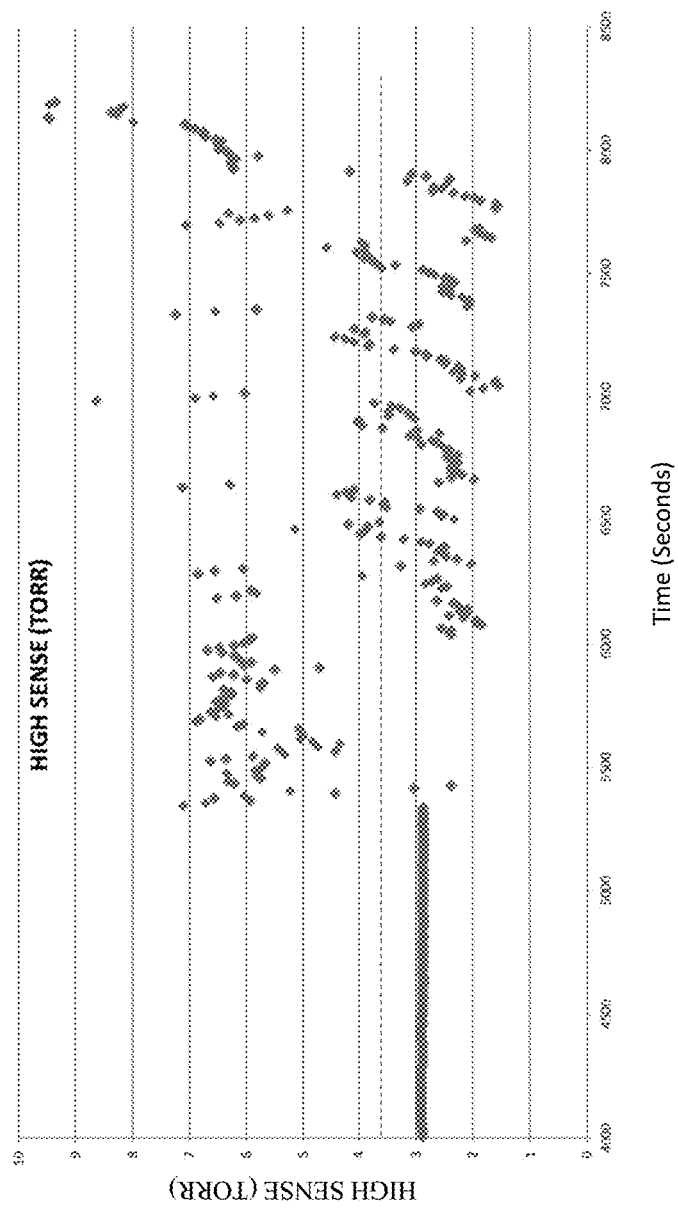
FIG. 15 is a graphical depiction of test results resulting from operation of an exemplary thermal ejector for controlling the pressure of a vacuum freezing chamber.

FIG. 15 is a graphical depiction of test results resulting from operation of thermal ejector 94 for controlling the pressure of the vacuum freezing chamber 54 (FIG. 9). The pressure in the vacuum freezing chamber can be maintained statically or periodically below the required triple point pressure of brackish water for the vacuum freezing.

Ice Washer 82 (FIG. 9). Nucleated ice 72 produced in the vacuum freezing chamber 54 may contain brackish water in the holes of the crystals. In washer 82, a nucleating agent slurry 92 from desilter 88 is used to remove the brackish water and leave only a slurry mixture 86 of purified water 84 and "cleaned" nucleated ice 72 that is provided to regenerator 80. A slurry 112, which is a mixture of nucleating agent slurry 92 and brackish water removed from nucleating ice 72, is provided to mixer 60

Water Regenerator 80 (FIG. 9). Pure vapor 70 and mixture 86 are mixed again in regenerator 80 to produce a mixture 90 of purified water 84 and nucleating agent(s) 62 at (relatively) high temperature and high pressure compared to the triple point of water. A vacuum pump 108 is used to remove any non-condensable gas from the system and maintain high vapor purity for a high mass transportation rate.

Desilter 88 (FIG. 9). Mixture 90 of purified liquid water 84 and nucleating agent(s) 62 produced in regenerator 80 is treated in desilter 88 to separate the purified liquid water 84 from particles of nucleating agent(s) 62. As shown in FIG. 9, a small portion of purified liquid water 84 is used as the carrier for removing nucleating agent(s) 62 in the form of nucleating agent slurry 92 to washer 82, where brackish water leftover on ice 72 is washed by the nucleating agent slurry 92.

Water Pump 66 (FIG. 9) is used to take remaining brackish water 68 from the vacuum freezing chamber 54 and discard to the ambient via heat exchanger 58, meanwhile maintaining the low pressure (deep vacuum) in the system.

As shown in FIG. 3, the overall energy consumption of the spray vacuum freezing desalination process of the present invention is largely determined by the vapor pressure in the vacuum chamber, which is determined by the freezing subcooling temperature. The subcooling of water will significantly increase the cost of energy for vapor compressing and transportation in vacuum freezing desalination process. In one embodiment, spray vacuum freezing desalination system, assisted with nucleating agents, can suppress subcooling of water to around 1° C., thus decreasing the overall system energy consumption to 1.7 kWh/m$^3$, much lower than energy consumption of existing technologies (>3 kWh/m$^3$). Specifically, comparing with thermal desalination technologies, a techno-economic analysis shows that the levelized cost of water using the vacuum freezing desalination technology is much lower than that of MED (38% less) and MSF (43% less).

It is to be understood that the various descriptions of the embodiments disclosed herein have been simplified to illustrate only those elements, features, and aspects that are relevant to a clear understanding of the disclosed embodiments, while eliminating, for purposes of clarity, other elements, features, and aspects. Persons having ordinary skill in the art, upon considering the present description of the disclosed embodiments, will recognize that other elements and/or features may be desirable in a particular implementation or application of the disclosed embodiments. However, because such other elements and/or features may be readily ascertained and implemented by persons having ordinary skill in the art upon considering the present description of the disclosed embodiments, and are therefore not necessary for a complete understanding of the disclosed embodiments, a description of such elements and/or features is not provided herein. As such, it is to be understood that the description set forth herein is merely exemplary and illustrative of the disclosed embodiments and is not intended to limit the scope of the invention as defined solely by the claims.

In the present disclosure, other than where otherwise indicated, all numbers expressing quantities or characteristics are to be understood as being prefaced and modified in all instances by the term "about." Accordingly, unless indicated to the contrary, any numerical parameters set forth in the following description may vary depending on the desired properties one seeks to obtain in the embodiments according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Any maximum numerical limitation recited herein is intended to include all lower numerical limitations subsumed therein and any minimum numerical limitation recited herein is intended to include all higher numerical limitations subsumed therein. Accordingly, Applicant reserves the right to amend the present disclosure, including the claims, to expressly recite any sub-range subsumed within the ranges expressly recited herein. All such ranges are intended to be inherently disclosed herein such that amending to expressly recite any such sub-ranges would comply with the requirements of 35 U.S.C. .sctn.112, first paragraph, and 35 U.S.C. .sctn.132(a).

The grammatical articles "one", "a", "an", and "the", as used herein, are intended to include "at least one" or "one or more", unless otherwise indicated. Thus, the articles are used herein to refer to one or more than one (i.e., to at least one) of the grammatical objects of the article. By way of example, "a component" means one or more components, and thus, possibly, more than one component is contemplated and may be employed or used in an implementation of the described embodiments.

Any patent, publication, or other disclosure material, in whole or in part, that is said to be incorporated by reference herein, is incorporated herein in its entirety, but only to the extent that the incorporated material does not conflict with existing definitions, statements, or other disclosure material expressly set forth in this disclosure. As such, and to the extent necessary, the express disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of purifying brackish water comprising:
mixing brackish water with a nucleating agent, forming nucleated liquid water;
distributing droplets of the nucleated liquid water inside a vacuum chamber;
vacuum freezing the droplets of the nucleated liquid water in the vacuum chamber, the droplets forming pure water vapor, nucleated ice, and remaining brackish water;
mixing and liquifying the pure water vapor and the nucleated ice, forming a mixture of purified liquid water and the nucleating agent; and
separating the mixture of purified liquid water and the nucleating agent, forming purified liquid water and the nucleating agent.

2. The method of claim 1, wherein the nucleating agent is taken from the group consisting of AgI, CuI, AgCl, $Ag_xCu_{1-x}I$, and combination thereof.

3. The method of claim 2, wherein particles of the nucleation agent are between 50 nanometers and 0.1 mm in diameter.

4. The method of claim 1, wherein the droplets of the nucleated liquid water are between 20 microns and 1.5 millimeters in diameter.

5. The method of claim 1, wherein vacuum freezing occurs at or below a temperature and pressure corresponding to a triple point of water.

6. The method of claim 5, wherein during vacuum freezing, subcooling of the remaining brackish water in the vacuum chamber is maintained at 2 degrees C. or less.

7. The method of claim 5, wherein during vacuum freezing, subcooling of the remaining brackish water in the vacuum chamber is maintained at 1 degree C. or less.

8. The method of claim 1 further comprises prior to the mixing and liquifying the pure water vapor and the nucleated ice, washing the nucleated ice with a portion of the purified liquid water to remove the brackish water from the nucleated ice.

9. The method of claim 8 further comprises pre-cooling the brackish water prior to mixing the brackish water with the nucleating agent, with remaining brackish water from the vacuum chamber.

10. The method of claim 8 further comprises, subsequent to vacuum freezing,
transporting the pure water vapor from the vacuum chamber to a regenerator by one or more of pumping, thermal ejecting, and mechanical blowing.

11. The method of claim 10, wherein in the regenerator, at least a portion of the pure water vapor condenses on a surface of the nucleated ice,
wherein both the pure water vapor and the nucleated ice are generated in and transported from the vacuum chamber.

12. The method of claim 1, wherein the nucleating agent is obtained by doping Cu in AgI.

13. The method of claim 12, wherein the nucleating agent obtained by doping Cu in AgI is $Ag_{0.3}Cu_{0.7}I$.

14. The method of claim 1, wherein during vacuum freezing, a portion of pure water of the droplets of the nucleated liquid water is frozen, while another portion of the pure water of the nucleated liquid water is vaporized, at a pressure between 200 Pa and 650 Pa.

15. The method of claim 10 further comprises a thermal ejector to pump pure water vapor from the vacuum chamber to the regenerator, the thermal ejector adapted to be driven by a thermal energy source operating at 120° C. or less.

16. The method of claim 10 further comprises a thermal ejector to pump pure water vapor from the vacuum chamber to the regenerator, the thermal ejector adapted to be driven by a thermal energy source operating at about 75° C.

17. A method of purifying brackish water comprising:
mixing brackish water with a nucleating agent, forming nucleated liquid water;
distributing droplets of the nucleated liquid water inside a vacuum chamber;
vacuum freezing the droplets of the nucleated liquid water in the vacuum chamber at or below a temperature and pressure corresponding to a triple point of water, the droplets forming pure water vapor, nucleated ice, and remaining brackish water;
mixing and liquifying the pure water vapor and the nucleated ice, forming a mixture of purified liquid water and the nucleating agent; and
separating the mixture of purified liquid water and the nucleating agent, forming purified liquid water and the nucleating agent.

18. The method of claim 17, wherein the nucleating agent is taken from the group consisting of AgI, CuI, AgCl, $Ag_xCu_{1-x}I$, and combination thereof.

19. The method of claim 17, wherein the nucleating agent is obtained by doping Cu in AgI.

20. The method of claim 19, wherein the nucleating agent obtained by doping Cu in AgI is $Ag_{0.3}Cu_{0.7}I$.

21. The method of claim 17, wherein during vacuum freezing, subcooling of the remaining brackish water in the vacuum chamber is maintained at 2 degrees C. or less.

22. The method of claim 17 further comprises, subsequent to vacuum freezing,
transporting the pure water vapor from the vacuum chamber to a regenerator by one or more of pumping, thermal ejecting, and mechanical blowing;
wherein in a regenerator, at least a portion of the pure water vapor condenses on a surface of the nucleated ice, wherein both the pure water vapor and the nucleated ice are generated in and transported from the vacuum chamber; and
a thermal ejector to pump pure water vapor from the vacuum chamber to the regenerator, the thermal ejector adapted to be driven by a thermal energy source operating at 120° C. or less.

* * * * *